United States Patent Office 3,090,512
Patented May 21, 1963

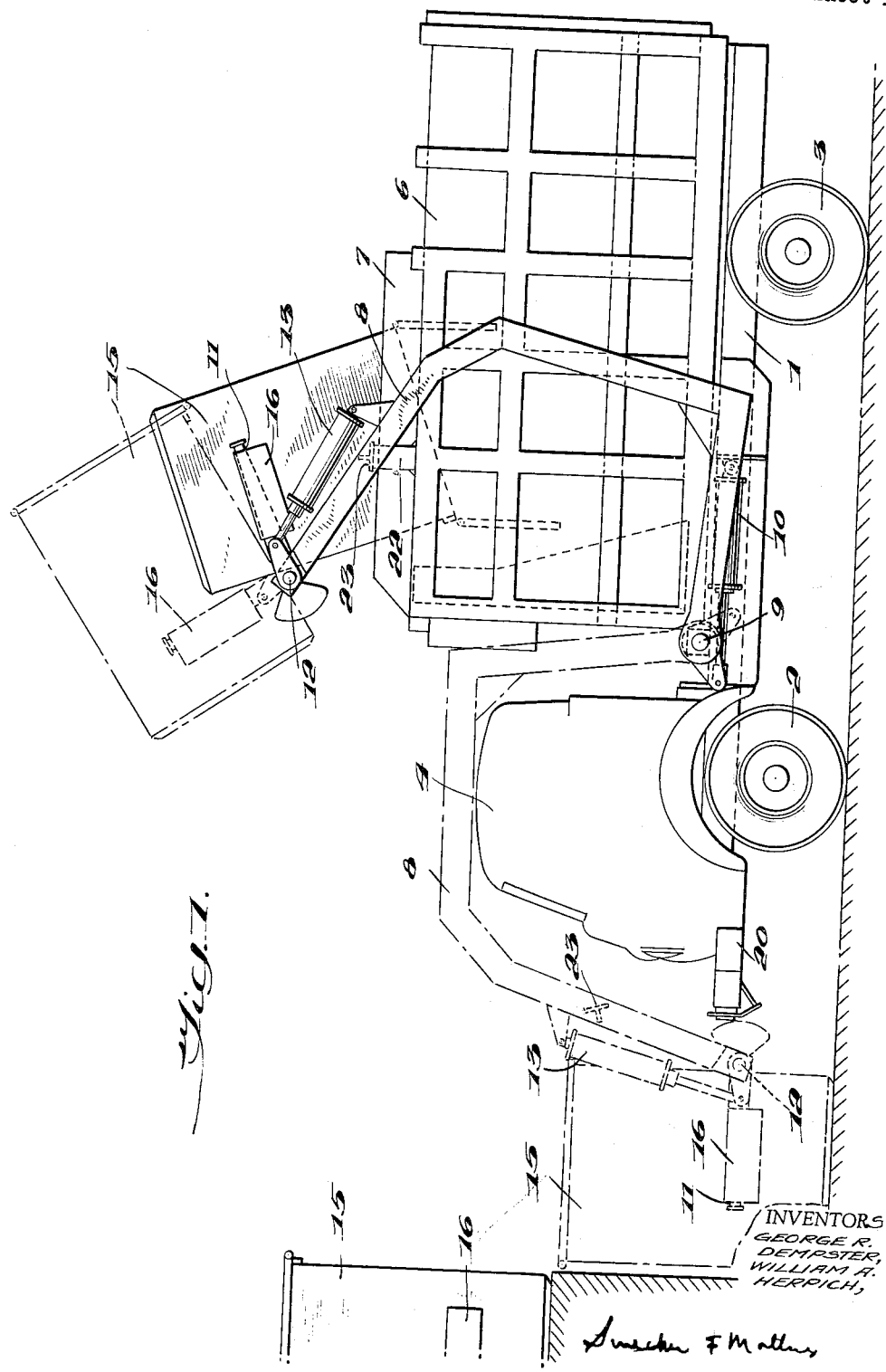

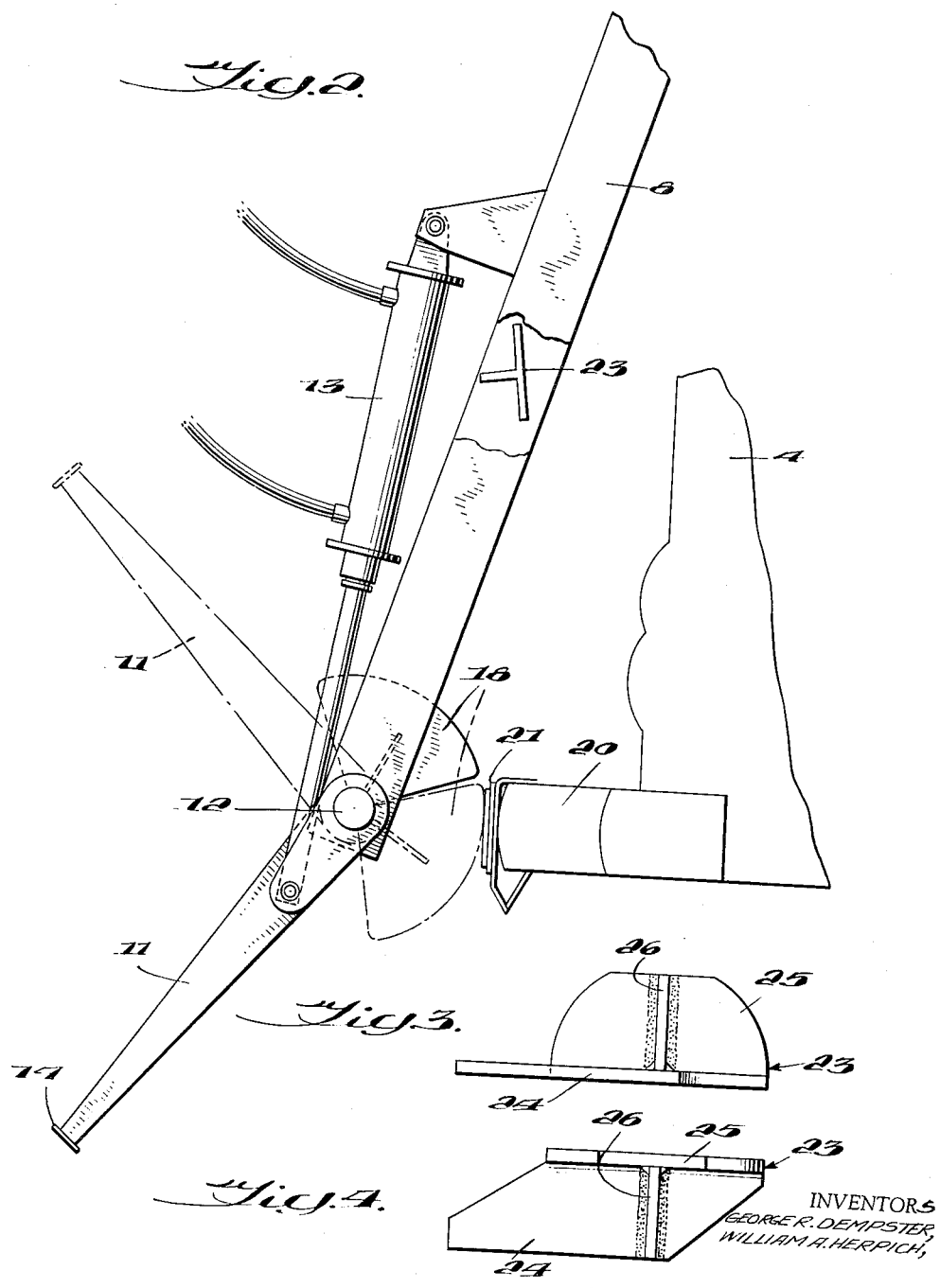

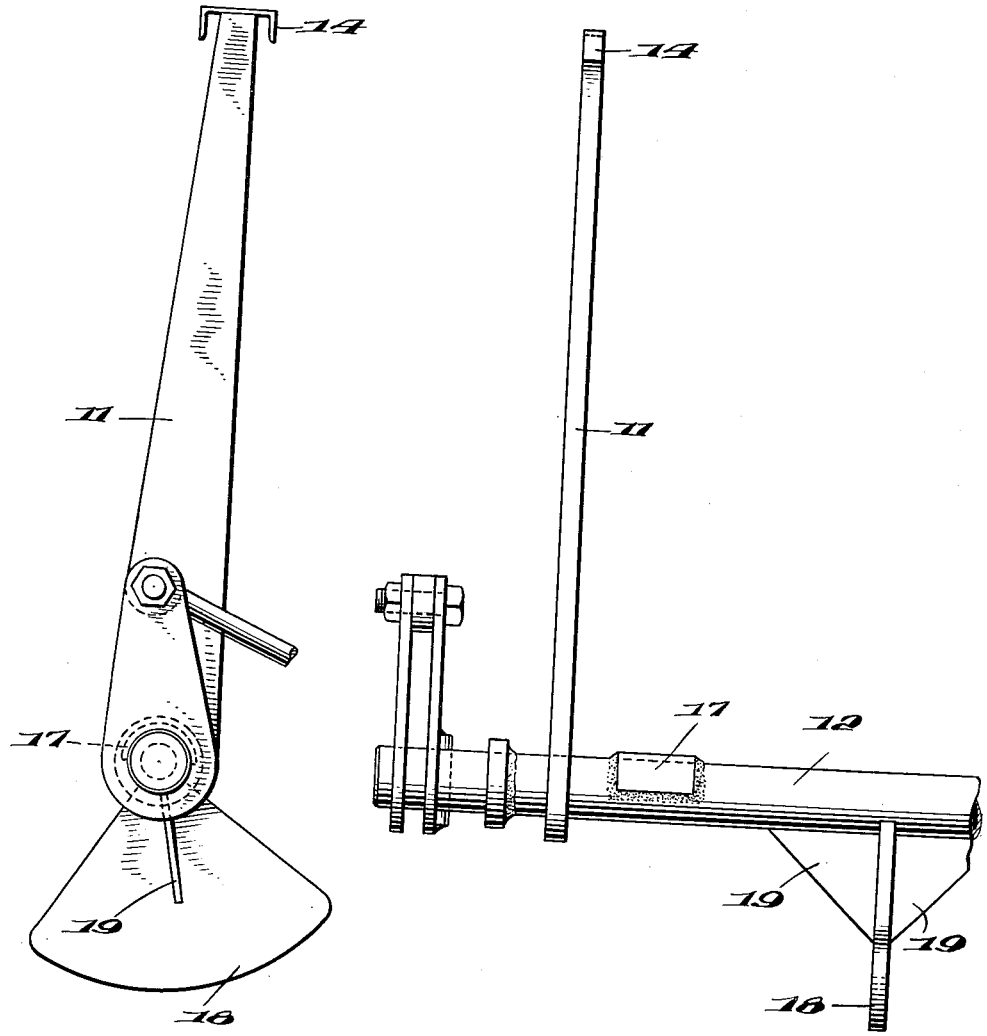

3,090,512
FRONT END LOADERS
George R. Dempster and William A. Herpich, Knoxville, Tenn.; said Herpich assignor to Dempster Brothers, Inc., Knoxville, Tenn., a corporation of Tennessee
Filed Aug. 7, 1958, Ser. No. 753,696
8 Claims. (Cl. 214—302)

This invention relates to improvements in front end loaders of the character used for picking up separate containers at the front end of a motor vehicle and dumping the contents therefrom into the body of the vehicle.

This application is a continuation-in-part of our prior copending application Serial No. 662,252, filed May 28, 1957, now Patent No. 2,900,096.

It has been the practice heretofore to use dumping equipment mounted on a motor vehicle having a refuse body, with a device mounted on the front portion of the vehicle adapted for engagement selectively with containers which are separate and independent of the vehicle, but which may be engaged at the front of the vehicle, picked up automatically and dumped over the front portion of the vehicle into the body.

In practice, the lifting arms, which are mounted on the vehicle, have connected with the free ends thereof a pair of fork arms which are moved into detachable engagement with a container, after which the container is elevated to a position over a hopper or opening in the top of the vehicle body for dumping the contents of the container into the body through such hopper or opening.

Various attempts have been made heretofore to limit or control the raised position of the lifting arms with the container in a dumping position. For the most part, such limiting or control means have interfered with the proper functioning of the lifting arms or the movement of the container. Where no limiting means was provided, the container would be thrust against a side of the opening or hopper, resulting in damage or injury to one or the other.

One object of this invention is to improve the construction of the equipment by providing improved limiting means for restricting the raised position of the lifting arms with the container in its proper dumping position.

Another object of the invention is to provide cooperating means on the lifting arms and body which are moved into coacting relation when the lifting arms elevate the container to the proper dumping position and prevent excessive movement of the container beyond said dumping position.

These objects may be accomplished, according to one embodiment of the invention, by providing support boxes on the body at opposite sides of the hopper or opening in positions to engage stop brackets carried by the inner faces of the lifting arms, so as to limit the upward swinging movement of the lifting arms when the container has been raised to the proper dumping position. Such support boxes and stop brackets are simple and inexpensive, adding little to the cost of the equipment, and are out of the way of the movement of the container, so as not to interfere with the action of the latter. At the same time, they protect the container and body against damage or injury, which may result from excessive movement of the container by the action of the lifting arms and hold the container in a proper dumping position.

Furthermore, as the vehicle moves the fork arms into lifting engagement with the container, when the latter is resting on the ground or other lower position, a considerable bending force is imparted to the depending front ends of the lifting arms during engagement with the container and shifting of the latter to supported positions on the lifting arms. No satisfactory provision has been made heretofore for absorbing the shock resulting therefrom.

A further object of the invention is to improve the construction of this equipment by providing shock means coacting between the lifting arms and front portion of the vehicle to limit the excessive bending stress imparted to the lifting arms at the time of engagement with the container and the lifting thereof.

This object may be accomplished by providing a bumper plate mounted on the front portion of the vehicle, such as an extension of the customary bumper thereon, in position to be engaged by one or more segmental shock extension plates connected with the front end portions of the lifting arms or the torque tube that extends therebetween carrying the fork arms. These segmental shock extension plates are in such relation as to engage the bumper plate when the lifting arms are lowered for engagement of the fork arms with the container, and thereby receive the shock of impact, directing it to the frame of the vehicle and relieving the lifting arms thereof.

This embodiment of the invention is illustrated in the accompanying drawings, in which:

FIG. 1 is a diagrammatic side elevation of a front end loader and container in which the present invention is used;

FIG. 2 is an enlarged side elevation of the front end portion of the lifting means;

FIG. 3 is a side elevation of one of the stop brackets removed;

FIG. 4 is a top plan view thereof;

FIG. 5 is a side elevation of one of the fork arms and its connected mechanism; and FIG. 6 is a plan view thereof.

The invention is shown as applied to a motor vehicle of conventional form, merely as an example of the type of vehicle on which this loading device may be used. It has been customary heretofore to utilize a vehicle chassis of the character generally indicated by the numeral 1 and which is self-propelled under control of an operator on road mounted wheels, such as the front and rear wheels indicated generally at 2 and 3. The cab is shown at 4 within which the operator is located.

A refuse body is shown at 6. This may be any suitable type of body adapted to receive refuse therein, such as garbage, trash and the like, and may be of the character that is provided with packer means to compress the refuse as it is deposited in the body. It is preferred that a body be used of the type having a filling opening or hopper, indicated at 7, in the top near the front, through which the refuse may be deposited into the body. The character of the body otherwise may be varied as desired.

Referring first to the form of the invention illustrated in FIGS. 1 and 2, the loader structure comprises a pair of lifting arms 8 spaced apart a distance substantially corresponding with the width of the cab 4. These arms 8 are preferably of gooseneck shape or of inverted U-shape, so as to extend over the top and downwardly in front and back of the cab 4 at the front portion of the truck, substantially as illustrated in FIG. 1. The arms should clear the cab fully, but the dimensions of the arms should be kept as reasonably close as practicable to the sides and top of the cab. Each of the arms may be formed of fabricated structure, either square or round in cross section and preferably tubular, for sufficient strength and rigidity and yet lightness in weight, as desired.

The arms 8 extend downward at the back of the cab 4, with their lower ends fixed on a torque tube 9 extending transversely of the vehicle and suitably journaled on the chassis frame 1. Hydraulic power devices, generally indicated at 10, are operatively connected with the arms 8 for swinging the latter to different positions, some of which are indicated by dotted lines in FIG. 1.

At the forward end of each lifting arm 8 is a pick-up arm or fork 11 extending forwardly of the vehicle from the outer end of the lifting arm 8 and mounted on a torque tube 12 extending therebetween, as illustrated more in detail in FIGS. 5 and 6. Suitable means may be used for manipulating the pick-up arms or forks 11, such, for example, as hydraulic power devices 13, as described more in detail in our prior application, Serial No. 662,252, filed May 28, 1957, now Patent No. 2,900,096. The outer end of each pick-up arm 11 is provided with a retainer 14 for insuring connection with the container.

A container is indicated generally at 15 and may be of any suitable or desired size and shape for receiving and containing refuse and the like. Such containers usually are provided with fork sleeves or channels, generally indicated at 16, on the end walls thereof, open at opposite ends and adapted to receive the pick-up arms or forks 11 therethrough, as will be apparent from FIG. 1. Each pick-up arm or fork 11 is preferably tapered lengthwise, as illustrated in FIG. 5, to allow a tolerance in the alignment of the forks and still permit insertion into the fork sleeves or channels 16. The tapered relation will also permit of a greater dumping angle when the container is turned upside down and has come to rest on the tapered arm.

The container 15 may be provided either with an open top or with suitable doors therein which may be opened for dumping of the contents, as described more in detail in our application mentioned above.

The torque tube 12 is shown in FIG. 6 as provided with bearing plates 17 on the periphery thereof and secured thereto by welding or in other suitable manner. These bearing plates 17 are located adjacent opposite ends of the torque tube just inside of the respective fork arms 11 for bearing engagement against the adjacent side wall of the container 15 when the fork arms are moved into engagement therewith. Due to the limited area of the bearing plates 17, wear on the wall of the container will be limited to very small areas and the torque tube will not wear at all.

Also secured to the torque tube 12 adjacent opposite ends thereof are segmental shock plates 18 disposed substantially diametrically opposite the fork arms 11 and extending radially outward from the torque tube. Each of the plates 18 is limited to substantially 90°, so as not to interfere with the engagement with a container, and is secured by welding or otherwise to the periphery of the torque tube. Bracing gusset plates 19 may be used on opposite sides of each plate 18 between the latter and the periphery of the torque tube 12 for holding the plate 18 in outstanding relation with respect to the torque tube.

Mounted on the front end portion of the vehicle, as, for example, on the bumper 20, is a bumper plate 21 in position to be engaged by each of the shock plates 18, as will be apparent from the positions indicated in FIGS. 1 and 2.

It is evident that as the fork arms 11 are moved substantially to their horizontal positions for engagement with the channels 16 on the container 15, the segmental shock plates 18 are turned to such positions as to be in bearing engagement with the bumper plate 21. Thus, the lowering movement of the lifting arms 8 and the effect of engagement of the lifting arms with the container will have the shock incident thereto received by the plates 18 and 21.

When the lifting arms 8 are moved to their elevated positions, as shown in full lines in FIG. 1, the container is in such position thereon as to dump the contents therefrom into the top opening or hopper 7 of the vehicle body 6. We have provided for limiting this raised or dumping position of the lifting arms so as to prevent excessive or overmovement thereof.

In this embodiment of the invention, the limiting means comprises support boxes 22 mounted on the body 6 at opposite sides of the opening or hopper 7 and coacting brackets 23 secured to the respective lifting arms 8 in positions to engage the support boxes when the lifting arms are moved to their elevated positions.

Each of the support boxes 22 is formed preferably of a box-like structure having a flat top, such as may be formed from a channel set upright and welded or otherwise secured to the upper portion of the body 6. This box projects slightly above the top edge of the hopper 7 in the embodiment here shown and in the proper position longitudinally of the body, to prevent overswinging of the lifting arms and container.

The stop bracket 23 is shown more in detail in FIGS. 2, 3 and 4. Each of the stop brackets 23 comprises an abutment plate 24 set obliquely with respect to the lifting arm 8, as will be apparent from FIGS. 1 and 2, and mounted on the inner face thereof by a mounting plate 25. A gusset plate 26 extends laterally over the contact plate 24 in bracing relation with the latter. The plates 24 and 25 may be formed in one piece, of angle bar or of separate pieces welded together, and the gusset plate 26 may be welded therebetween.

The stop brackets 23 are secured to the inner faces of the lifting arms 8, which latter are spaced apart sufficiently to lie just outside the hopper opening 7, whereby the stop brackets are in vertical alignment with the support boxes on the body when the lifting arms are moved to proper dumping position of the container. This restricts the swinging movement of the lifting arms and container and prevents injury either to the container or to the body.

While the invention has been illustrated and described in one embodiment, it is recognized that variations and changes may be made therein without departing from the invention as set forth in the claims.

We claim:
1. In a front end loader of the character described, the combination with a motor vehicle having a vehicle frame, of a loading unit operatively mounted on the vehicle including a pair of lifting arms, a torque tube carried by the lifting arms at the front of the vehicle, a pair of fork arms mounted on the torque tube for detachable connection with a separate container, a bearing plate connected with the vehicle frame at the front thereof, and shock plates connected with the torque tube in positions for bearing engagement with the bearing plate upon engagement of the fork arms with the container to transfer to the vehicle frame the shock thereof.

2. In a front end loader of the character described, the combination with a motor vehicle of the type having a body adapted to receive material therein and having in front of the body an operator's cab with wheels on opposite sides thereof near the front end thereof, of a loading mechanism comprising a pair of rigid lifting arms each having a rigid end portion pivotally mounted on said vehicle for swinging movements about a substantially horizontal axis located rearwardly of said cab, and each arm having a separate end portion rigid with the first-mentioned end portion and spaced from said pivotal mounting on the vehicle, means for swinging said lifting arms about said axis between a lowered position in which said last-mentioned end portion of said arms extend forwardly to a location below the tops of said wheels and in front of said cab and a raised position in which said last-mentioned end portions of said arms extend upwardly to a location near the top of said body, each of said arms being of a rigid angular configuration such that, in its lowered position, it extends over the top of the adjacent wheel and its front end portion extends downwardly to said location below the top of the wheel and in front of the cab, means on the front portions of said arms for detachable engagement with a container to lift the container upon swinging movement of the arms and dump the contents therefrom into said body, and rigid means on the front end portions of the arms for transmitting the impact of engagement with the container to the motor vehicle.

3. In a front end loader of the character described, the combination with a motor vehicle of the type having a body adapted to receive material therein and having in front of the body an operator's cab with wheels on opposite sides thereof near the front end thereof, of a loading mechanism comprising a pair of rigid lifting arms each having a rigid end portion pivotally mounted on said vehicle for swinging movements about a substantially horizontal axis located rearwardly of said cab, and each arm having a separate end portion rigid with the first-mentioned end portion and spaced from said pivotal mounting on the vehicle, means for swinging said lifting arms about said axis between a lowered position in which said last-mentioned end portion of said arms extend forwardly to a location below the tops of said wheels and in front of said cab and a raised position in which said last-mentioned end portions of said arms extend upwardly to a location near the top of said body, each of said arms being of a rigid angular configuration such that, in its lowered position, it extends over the top of the adjacent wheel and its front end portion extends downwardly to said location below the top of the wheel and in front of the cab, means on the front portions of said arms for detachable engagement with a container to lift the container upon swinging movement of the arms and dump the contents therefrom into said body, rigid shock plates connected with the free end portions of the arms, and means on the front end portions of the vehicle for engagement by the shock plates for transmitting thereto the impact of engagement with the container.

4. In a front end loader of the character described, the combination with a motor vehicle, of a loader unit operatively mounted on the vehicle and including a pair of lifting arms movable between a lowered position wherein the lifting arms extend to the front of the vehicle and a raised position wherein the lifting arms extend over the vehicle, a torque tube extending transversely between the lifting arms, means mounted on the torque tube adjacent the lifting arms for detachable engagement with the container for lifting the container relative to the vehicle whereupon the container moves relative to the torque tube, and bearing plates on the periphery of the torque tube adjacent opposite end portions thereof for bearing engagement against the adjacent side of the container during lifting movement of the container by the lifting arms.

5. In a front end loader of the character described, the combination of loading mechanism comprising a pair of lifting arms movable between a lowered position wherein the lifting arms extend to the front of the vehicle and a raised position wherein the lifting arms extend over the vehicle, mounting means for the lifting arms at one end thereof, a torque tube connecting the arms together at the opposite end thereof, means for turning the torque tube relative to the arms, means supported by the torque tube for holding a container thereon in bearing relation against the torque tube, and bearing plates spaced along the length of the torque tube and holding the container spaced therefrom through a major portion of the length of the torque tube.

6. In a front end loader of the character described, the combination of loading mechanism comprising a pair of lifting arms movable between a lowered position wherein the lifting arms extend to the front of the vehicle and a raised position wherein the lifting arms extend over the vehicle, mounting means for the lifting arms at one end thereof, a torque tube connecting the arms together at the opposite end thereof, means for turning the torque tube relative to the arms, a container, means supported by the torque tube and movable therewith for holding the container in bearing relation against the torque tube, and bearing plates spaced along the length of the torque tube between the torque tube and the container and holding the container spaced therefrom through a major portion of the length of the torque tube.

7. In a front end loader of the character described, the combination of loading mechanism comprising a pair of lifting arms movable between a lowered position wherein the lifting arms extend to the front of the vehicle and a raised position wherein the lifting arms extend over the vehicle, mounting means for the lifting arms at one end thereof, a torque tube connecting the arms together at the opposite end thereof, means for turning the torque tube relative to the arms, a container, means supported by the torque tube and movable therewith for holding the container in spaced bearing relation with respect to the torque tube.

8. In a front end loader of the character described, the combination with a motor vehicle of the type having a body provided with an opening in the top thereof adapted to receive material therein, of a pair of lifting arms pivotally mounted on the vehicle for swinging movement between a lowered position wherein the free ends of the lifting arms extend to the front of the vehicle and a raised position wherein the free ends of the lifting arms extend over the body; power means for swinging the lifting arms in paths of movement to said lowered and raised positions; means on the free ends of the lifting arms for detachably engaging a separable container when the lifting arms are in a lowered position and cooperating to lift a separable container in a generally upright position to an elevated location above the body and to invert the container to dump the contents thereof into the body; a bracket member mounted on and movable with each lifting arm and including a bearing surface projecting inwardly from the lifting arm, and support members on the body at opposite edges of the top opening and spaced inwardly from the paths of movement of the arms, said bracket members and support members being in position to be aligned in abutting relation when the lifting arms are in the raised position to support the weight of the separable container and to stabilize the free ends of the lifting arms during the time that the container is being inverted.

References Cited in the file of this patent
UNITED STATES PATENTS

| | | |
|---|---|---|
| 2,459,473 | Troutman | Jan. 18, 1949 |
| 2,643,011 | Brisson et al. | June 23, 1953 |
| 2,679,326 | Isaksen | May 25, 1954 |
| 2,824,655 | Harbers | Feb. 25, 1958 |
| 2,824,657 | Beasley et al. | Feb. 25, 1958 |
| 2,900,096 | Dempster et al. | Aug. 18, 1959 |